United States Patent [19]
Kusumoto et al.

[11] Patent Number: 5,649,879
[45] Date of Patent: Jul. 22, 1997

[54] PLANETARY GEAR REDUCTION MECHANISM

[75] Inventors: Keiichi Kusumoto; Keiichi Konishi; Shuzo Isozumi, all of Tokyo, Japan

[73] Assignee: Mitsubishi Denki Kabushiki Kaisha, Tokyo, Japan

[21] Appl. No.: 530,963

[22] Filed: Sep. 20, 1995

[30] Foreign Application Priority Data

Aug. 18, 1995 [JP] Japan .................................. 7-210614

[51] Int. Cl.$^6$ ...................................... F16H 57/08
[52] U.S. Cl. ...................... 475/331; 475/346; 74/7 E
[58] Field of Search .......................... 475/331, 346, 475/334, 338, 339; 74/7 A, 7 E

[56] References Cited

U.S. PATENT DOCUMENTS

| | | | |
|---|---|---|---|
| 4,183,266 | 1/1980 | Osumi | 475/331 X |
| 4,517,858 | 5/1985 | Schafer | 475/331 X |
| 4,848,172 | 7/1989 | Morishita | 74/7 E |
| 4,891,996 | 1/1990 | Isozumi et al. | 74/6 |
| 4,899,605 | 2/1990 | Tanaka | 475/331 X |
| 4,920,812 | 5/1990 | Okamoto et al. | 475/331 X |
| 5,027,664 | 7/1991 | Isozumi | 475/331 X |
| 5,195,389 | 3/1993 | Isozumi | 74/7 E |
| 5,269,734 | 12/1993 | Menge, Sr. | 475/339 |
| 5,323,663 | 6/1994 | Ohgi et al. | 74/7 A X |
| 5,382,203 | 1/1995 | Bellman et al. | 475/346 X |
| 5,480,362 | 1/1996 | Tanaka et al. | 475/346 |

FOREIGN PATENT DOCUMENTS

| | | |
|---|---|---|
| 101252 | 7/1985 | Japan . |
| 61-81575 | 4/1986 | Japan . |
| 104684 | 7/1988 | Japan . |
| 2117836 | 10/1983 | United Kingdom . |

Primary Examiner—Charles A. Marmor
Assistant Examiner—Peter T. Kwon
Attorney, Agent, or Firm—Sughrue, Mion, Zinn, Macpeak & Seas

[57] ABSTRACT

A planetary gear reduction mechanism permitting easy mounting of a plate that separates a gear reduction section from a motor section. A flange portion 20 that is integrally formed with an output shaft rotation axis 11 is provided on its rear side a ring of support pins 21 having an open-ended cylinder shape and circumferentially equally spaced in a circle. A plate 22 has on its front side of the flange portion 22a a ring of projections 22b circumferentially equally spaced, and the projections 22b are engaged with the support pins 21. With planetary gears 7 attached onto the support pins 21, the plate 22 is mounted by press-fit inserting the projections 22b into the openings of the support pins 21.

4 Claims, 7 Drawing Sheets

PLANETARY GEAR REDUCTION MECHANISM

BACKGROUND OF THE INVENTION

1. Field of the Invention

The present invention relates to a planetary gear reduction mechanism for use in the starter of an internal combustion engine.

2. Description of the Related Art

FIG. 12 is a cross-sectional view of a known planetary gear reduction starter that is a motor having permanent magnets.

As shown, a DC motor armature 1 as a rotor is integrally attached on to an armature rotation shaft 2. A cylindrical yoke 3 surrounds the armature 1. The front end of the yoke 3 is received in a front bracket 5.

An inner gear 4 is integrally formed with the front end portion of the yoke 3. An inwardly projecting disk-like flange 4a is integrally formed with the front end of the yoke 3. The flange 4a has on its inner edge a cylindrical flange 4b extending toward the front. A sun gear 6 is integrally formed with the armature rotation shaft 2 on its front end.

A flange portion 10 that constitutes the arm of a planetary gear reduction mechanism is integrally formed with an output shaft 11. The output shaft 11 is supported by a sleeve bearing 12 that is received in and secured by the flange 4b. The flange portion 10 has a ring of through holes 10a that are circumferentially equally spaced in a circle. A support pin 9 is press-fit inserted into each of the through holes 10a. Each planetary gear 7 is supported on its bearing 8 that is attached to the corresponding pin 9. Each planetary gear 7 is meshed with the sun gear 6 and the inner gear 4 in a planetary gear reduction mechanism.

A sleeve bearing 13 is attached into the socket portion of the output shaft 11 open toward the rear side. The armature 2 is supported on its front end by the sleeve bearing 13. A steel ball 14 is disposed between the end of the armature rotation shaft 2 and the bottom of the socket of the output shaft 11, in order to receive thrust load.

Permanent magnets 15 whose number agrees with the number of the poles of the motor are arranged on the inner circumference of the yoke 3 surrounding the armature 1. A washer 16, disposed between the output shaft 11 and the flange 4a, restricts displacement of the output shaft 11 in the direction of thrust. The washer 16 also prevents the flange portion 10 from abutting the flange 4a of the inner gear 4 so that the output shaft 11 may rotate smoothly.

The operation of the above prior art planetary gear reduction starter is now discussed.

When a key switch (not shown) is closed, the armature 1 is power fed and activated. The armature 1 starts to rotate under the permanent magnets 15. The rotary motion of the armature 1 is transmitted to the planetary gear 7 via the sun gear 6 on the armature rotation axis 2. Since the planetary gear 7 is meshed with the inner gear 4, the planetary gear 7 rotates about its own shaft axis, namely about support pin 9, while revolving at the same time about the armature rotation 2. The rotary motion of the armature 1 is thus transmitted to the flange portion 10 with rotational speed reduced. The rotary motion of the armature 1 is further transmitted via the flange portion 10 to the output shaft 11. The rotary motion of the output shaft 11 is transmitted to a ring gear (not shown) of an internal combustion engine via the pinion (not shown) of an over-running clutch.

In the above prior art planetary gear reduction starter, the motor section is not isolated from its reduction section. The dust generated in the motor section is introduced into meshed portions of the planetary gears 7, the inner gear 4 and the sun gear 6, thereby damaging the planetary gear reduction mechanism.

To resolve the above problem, the motor section and the reduction section must be isolated by disposing a plate therebetween. However, the mounting of the plate is physically difficult because the yoke 3 and the inner gear 4 are integrally formed.

SUMMARY OF THE INVENTION

In view of the above problem, the present invention has been developed. It is an object of the present invention to provide a planetary gear reduction mechanism which features a design that permits easy mounting of a plate for isolating a motor section from its reduction section.

In order to achieve the above object, according to one aspect of the present invention, there is provided a planetary gear reduction mechanism that comprises an inner gear, an output shaft rotation axis which has an integrally formed flange portion on its rear side and which is supported at a bearing attached to the inner circumference of a flange of said inner gear, a rotation shaft supported at a bearing attached in a socket portion of the output shaft on its rear side inner circumference, a ring of plurality of support pins that are circumferentially equally spaced in a circle on the rear surface of the flange portion, a plurality of planetary gears rotatably supported about the plurality of support pins in a manner that the plurality of planetary gears are meshed with the inner gear and the sun gear formed on the front end of the rotation shaft, and a substantially circular plate which has on its front surface a ring of plurality of mating portions that are circumferentially equally spaced in a circle, whereby said plurality of mating portions are coupled to the plurality of support pins in order to seal the planetary gears.

According to another aspect of the present invention, there is provided a planetary gear reduction mechanism that comprises an inner gear, an output shaft which has on its rear end an integrally formed flange portion having a ring of plurality of through holes that are circumferentially equally spaced in a circle, the output shaft being supported at a bearing attached to the inner circumference of a flange of the inner gear, a rotation shaft supported at a bearing attached in a socket portion of the output shaft on its rear side inner circumference, a substantially circular plate which has on its front surface a ring of plurality of support pins circumferentially equally spaced in a circle, the substantially circular plate being attached to the flange portion by press-fit inserting the plurality of support pins into the plurality of through holes, and a plurality of planetary gears rotatably supported about the plurality of support pins in a manner that the plurality of planetary gears are meshed with the inner gear and the sun gear formed on the front end of the rotation shaft.

According to further aspect of the present invention, there is provided a planetary gear reduction mechanism that comprises an inner gear, an output shaft which has an integrally formed flange portion on its rear side and which is supported at a bearing attached to the inner circumference of a flange of the inner gear, a rotation shaft supported at a bearing attached in a socket portion of the output shaft on its rear side inner circumference, a ring of plurality of support pins that are circumferentially equally spaced in a circle on the flange portion, a plurality of planetary gears rotatably supported about the plurality of support pins in a manner that the plurality of planetary gears are meshed with the inner gear and the sun gear formed on the front end of the rotation shaft, and a substantially circular plate which has a plurality of tabs extending radially inwardly from its outer circumference, the substantially circular plate abutting on its front side to the plurality of support pins and passing each of the plurality of tabs through between two neighboring planetary gears to put the plurality of tabs into an elastic locking engagement with the outer circumference of the flange portion, thereby the plurality of planetary gears are separated from the outside.

DESCRIPTION OF THE PREFERRED EMBODIMENTS

Embodiment 1

Figure 1:
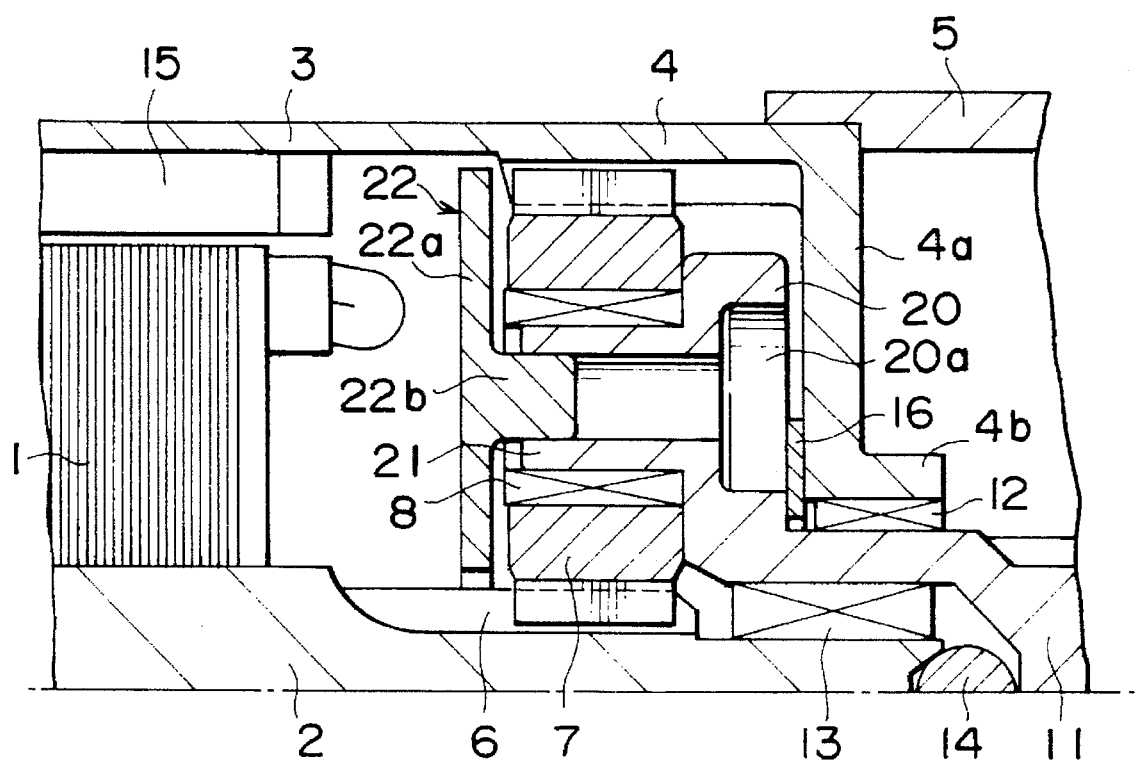
FIG. 1 is a cross-sectional view showing the planetary gear reduction mechanism and its associated components of the planetary gear reduction starter according to embodiment 1 of the present invention.
Figure 2:
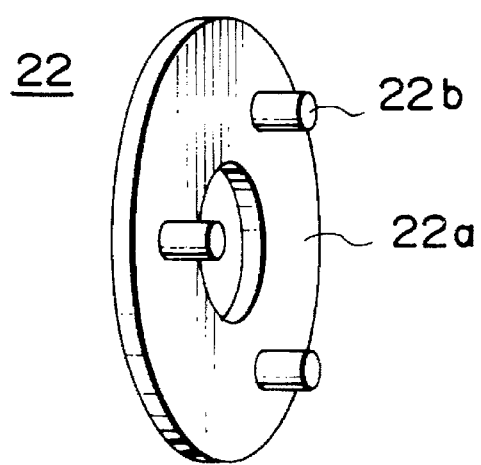
FIG. 2 is a perspective view showing a plate in the planetary gear reduction mechanism according to embodiment I of the present invention.
Figure 12:
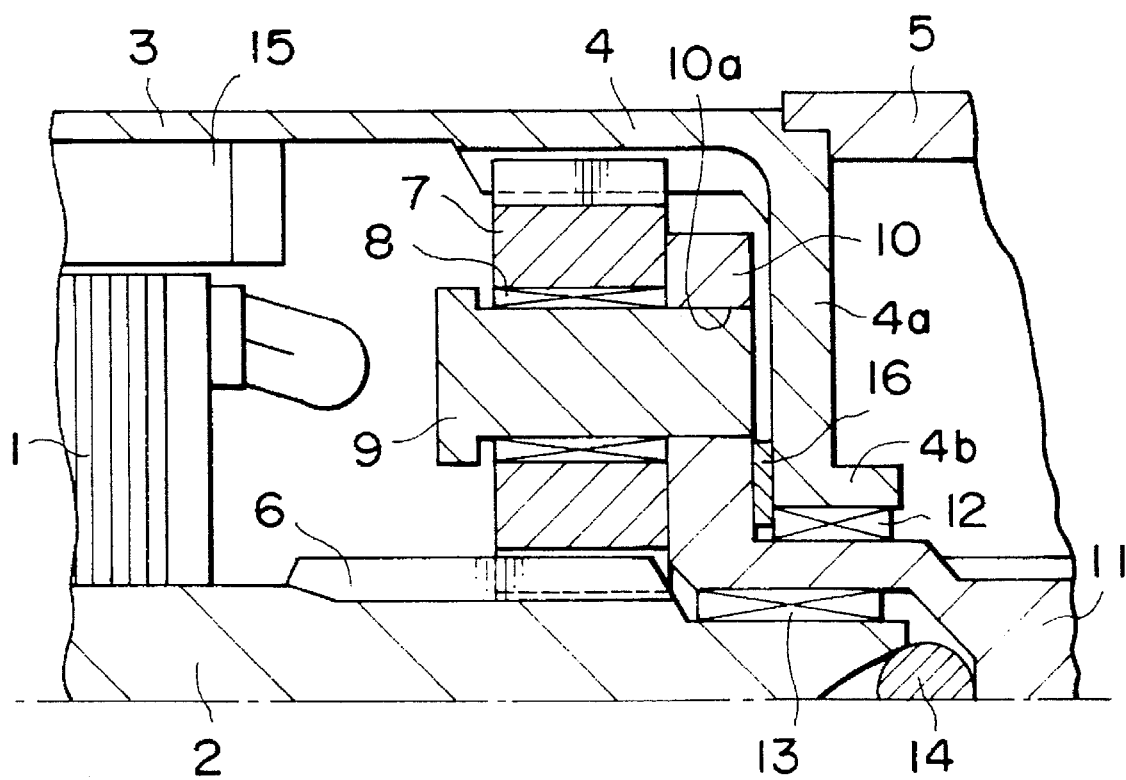
FIG. 12 is a cross-sectional view showing the prior art planetary gear reduction starter employing permanent magnets in the form of a motor.

FIG. 1 is the cross-sectional view showing the planetary gear reduction mechanism and its associated components in the planetary gear reduction starter according to the embodiment 1 of the present invention. FIG. 2 is the perspective view showing the plate in the planetary gear reduction mechanism according to the embodiment 1 of the present invention. Those components equivalent to those described with reference to FIG. 12 are designated with the same reference numerals, and their explanation is not repeated.

As shown, a flange portion 20 is integrally formed with an output shaft 11. The flange portion 20 has on its front end surface a ring of recesses 20a circumferentially equally spaced in a circle. Furthermore, the flange portion 20 has on its rear end surface a ring of support pins 21 projected coaxially with the respective recesses 20a to rotatably support planetary gears 7. Each of the support pins 21 has a hollow which communicates with the respective recess 20a and is open to the rear side.

A plate 22 has a ring of solid cylindrical projections 22b circumferentially equally spaced in a circle on a flange portion 22a in a manner that each solid cylindrical projection 22b is mated with the respective support pin 21 disposed on the flange portion 20. The diameter of the solid cylindrical projections 22b is designed to be slightly greater than the inner diameter of the support pins 21. The plate 22 is secured by press-fit inserting the projections 22b into the openings of the support pins 21. The flange portion 22a of the plate 22 is sized to be substantially circular and generally coextensive with the planetary gears 7 rotatably supported by the support pins 21. The remaining construction of the planetary gear reduction starter remains unchanged from the one already shown in FIG. 12.

To assemble the planetary gear reduction mechanism described above, a planetary gear 7 having sleeve bearing 8 attached on its inner circumference is mounted onto each support pin 21. A projection 22b is press-fit inserted into the top opening of each support pin 21 to secure the plate 22 onto the flange portion 20. Axial motion of the planetary gears 7 is restrained between the flange portion 20 and the flange portion 22a of the plate 22.

In succession, the output shaft 11 having the washer 16 attached thereon is inserted into the sleeve bearing 12 attached onto the inner circumference of the flange 4b of the inner gear 4. The planetary gears 7 are thus meshed with the inner gear 4. The armature shaft 2 is then inserted into the sleeve bearing 13 attached into the socket portion of the output shaft 11 at its rear side inner circumference. The planetary gears 7 are then meshed with the sun gear 6. A planetary gear reduction mechanism thus assembled comprises the plate 22 that isolates the reduction section made up of the planetary gears 7, the inner gear 4 and the sun gear 6.

According to the embodiment 1 of the present invention, the plate 22 separates the reduction section from the motor section, substantially preventing dust generated in the motor section from entering into the reduction section and thereby reducing the frequency of damage of the planetary gear reduction mechanism.

Since the projections 22b disposed on the flange portion 22a of the plate 22 are press-fit inserted into the openings of the support pins 21, their mounting mechanism is simple with no extra components required.

The plate 22 prevents the planetary gears 7 rotatably supported by the support pins 21 from coming off the support pins 21. The planetary gears 7 and the flange portion 20 are assembled in a unitary structure, which enhances ease of assembly of the planetary gear reduction mechanism.

Since the support pins 21 are integrally formed with the flange portion 20, for example, in forging process, the support pins 21 are projected accurately at a right angle. Component count is thus reduced. The support pins 21 accurately projected at a right angle control poor meshing between the planetary gears 7, the inner gear 4 and the sun gear 6. A reduced component count not only enhances ease of assembly but reduces the manufacturing cost of the mechanism.

When the support pins 21 are formed in forging process, the inner diameter of the recesses 20a (the outer diameter of a punch) is set be greater than the outer diameter (the diameter of the impacted projection) of the support pins 21. This not only permits a greater projection length of each support pin 21 but also achieves an increased mechanical strength of the structure. Since the support pin 21 is shaped to be cylindrical, the projection length of each support pin is increased even more.

The increased projection length of each support pin 21 assures more contact area between the support pin 21 and the bearing 8 attached onto the inner circumference of the planetary gear 7, decreasing mechanical load exerted onto a unit area of the bearing 8 and consequently reducing the wear rate of the bearing 8. The axial length of each planetary gear 7 may be designed to be equal to the projection length of the support pin 21. This means a long axial length of the planetary gear 7, and therefore a mechanically strong planetary gear 7 results.

Embodiment 2

Figure 3:
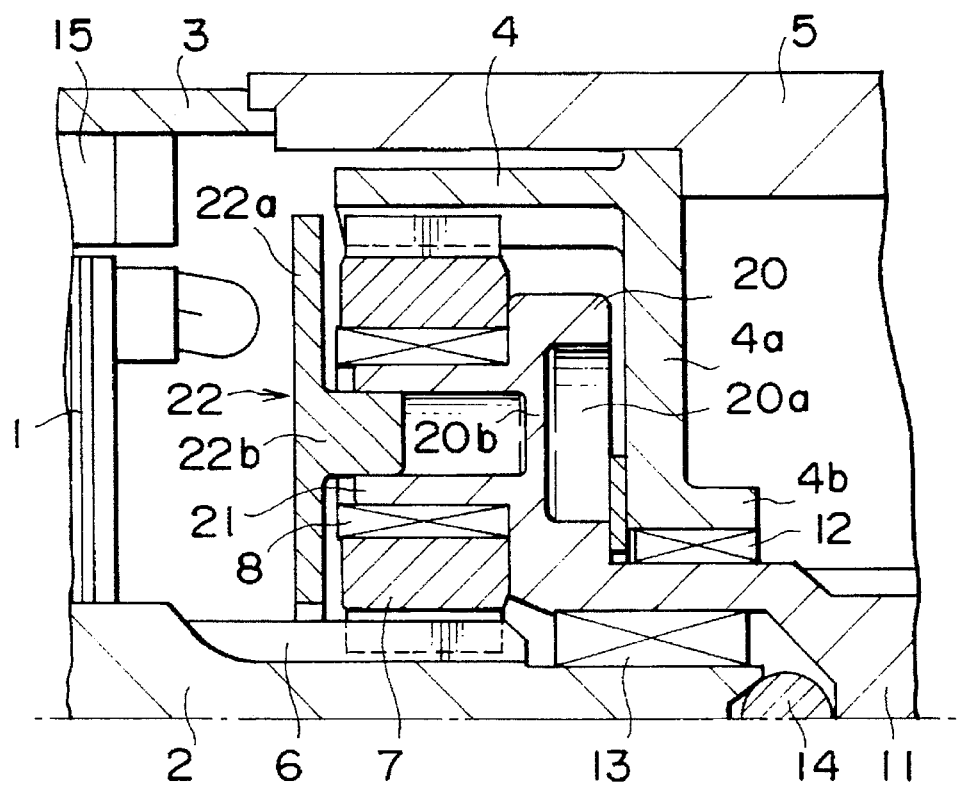
FIG. 3 is a cross-sectional view showing the planetary gear reduction mechanism and its associated components of the planetary gear reduction starter according embodiment 2 of the present invention.

The embodiment 2 of the present invention, as illustrated in FIG. 3, is different from the embodiment 1 in that the embodiment 2 has the yoke 3 and the inner gear 4 separately formed rather than both being a unitary structure, and that the support pin has a hollow closed by a bottom wall 20b, thus partitioned from the recess 20a. The remaining construction is identical to the embodiment 1.

The embodiment 2 offers the same advantages as the embodiment 1.

Embodiment 3

Figure 4:
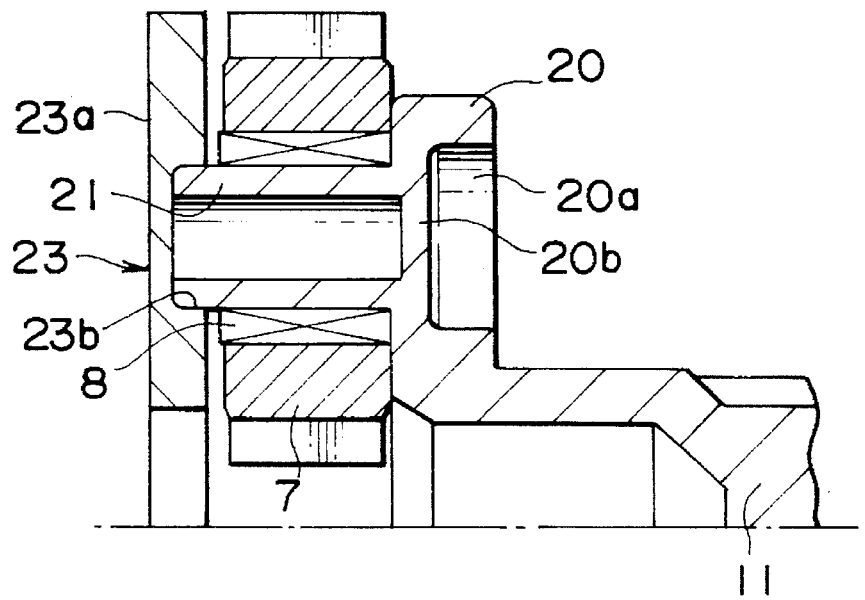
FIG. 4 is a cross-sectional view showing the major components of the planetary gear reduction mechanism according to embodiment 3 of the present invention.
Figure 5:
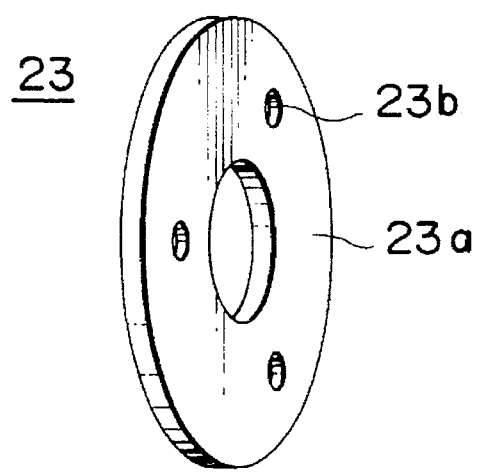
FIG. 5 is a perspective view showing a plate in the planetary gear reduction mechanism according to embodiment 3 of the present invention.

FIGS. 4 and 5 show the embodiment 3. Disposed on the front side of the flange portion 23a of the plate 23 are a ring of socket portions 23b that are circumferentially equally spaced in a circle so that the socket portions 23b are engaged with the plurality of support pins 21 projected from the flange portion 20. The inner diameter of the socket portions 23b is designed to be slightly smaller than the diameter of the support pins 21. The plate 23 is mounted by press-fit inserting the top portion of each support pin 21 into the respective socket portion 23b. The flange portion 23a of the plate 23 is sized to be substantially circular and generally coextensive with the planetary gears 7 rotatably supported by the support pins 21. The rest of the construction remains unchanged from that of the embodiment 2.

As in the preceding embodiments, the plate 23 is rigidly attached onto the support pins 21 so that the plate 23 covers the planetary gears 7 rotatably supported by the support pins 21 in the embodiment 3. The embodiment 3 thus offers the same advantage as the embodiment 2.

Embodiment 4

Figure 6:
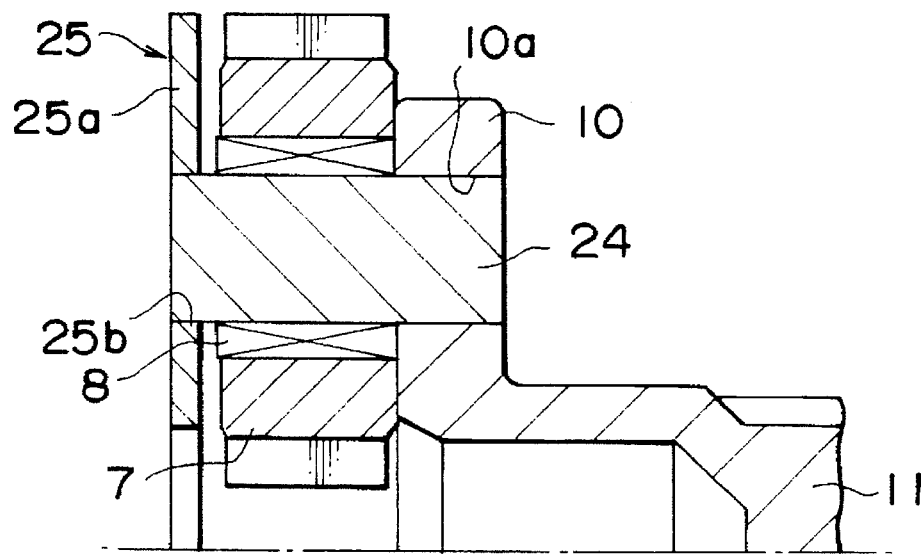
FIG. 6 is a cross-sectional view showing the major components of the planetary gear reduction mechanism according to embodiment 4 of the present invention.

In the embodiment 4 as shown in FIG. 6, the flange portion 10 integrally formed with the output shaft 11 has a ring of plurality of through holes 10a that are circumferentially equally spaced in a circle. A support pin 24 is press-fit inserted into each through hole 10a. A plate 25 has on its flange portion 25a a ring of circumferentially equally spaced through holes 25b that are engaged with the corresponding support pins 24 attached onto the flange portion 10. The inner diameter of the through holes 25b is designed to be slightly smaller than the outer diameter of the support pins 24. To assemble the plate 25, the planetary gears 7 are first mounted onto the support pins 24, and then the top portions of the support pins 24 are press-fit inserted into the through holes 25b. The flange portion 25a of the plate 25 is sized to be generally coextensive with the planetary gears 7 rotatably supported by the support pins 24. The rest of the construction remains unchanged from that of the embodiment 1.

In the embodiment 4, the plate 25 is rigidly attached onto the support pins 24 so that the plate 25 covers the planetary gears 7 rotatably supported by the support pins 24. The embodiment 4 thus offers the same advantage as the embodiment 1.

Embodiment 5

Figure 7:
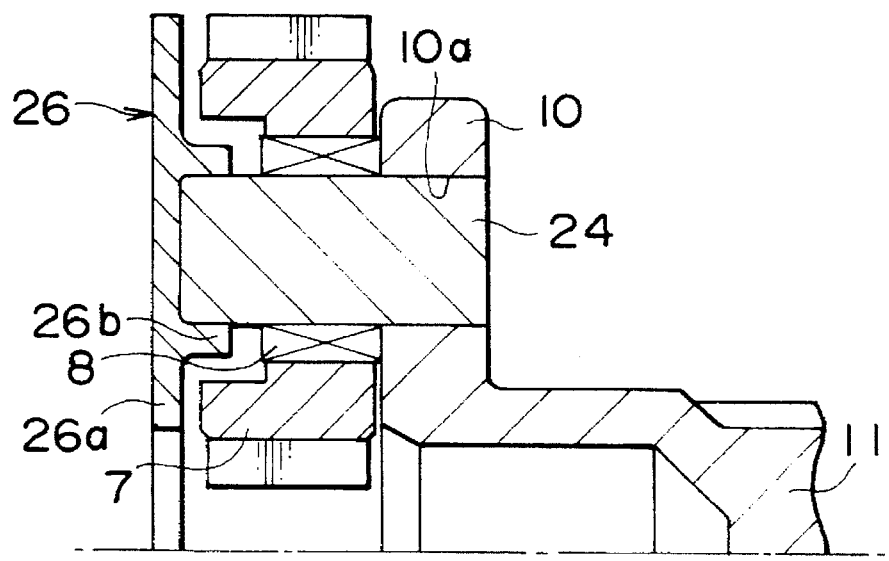
FIG. 7 is a cross-sectional view showing the major components of the planetary gear reduction mechanism according to embodiment 5 of the present invention.

In the embodiment 5 as shown in FIG. 7, disposed on the front side of the flange portion 26a of a plate 26 are a ring of ring-projections 26b circumferentially equally spaced in a circle so that each projection 26b receives the corresponding support pin 24 projected from the flange portion 10. The inner diameter of the ring-projections 26b is designed to be slightly smaller than the outer diameter of the support pins 24. The plate 26 is mounted by press-fit inserting the top end of each support pin 24 into the corresponding ring-projection 26b after mounting the planetary gears 7 onto the support pins 24. The flange portion 26a of the flange plate 26 is sized to be substantially circular and generally coextensive with the planetary gears 7 rotatably supported by the support pins 24. To prevent the ring-projections 26b from contact interfering with the planetary gears 7 in the assembled state of the plate 26, the rear end of each planetary gear 7 is partly recessed. The rest of the construction remains unchanged from that of the embodiment 4.

In the embodiment 5, the plate 26 is rigidly attached onto the support pins 24 so that the plate 26 covers the planetary gears 7 rotatably supported by the support pins 24. The embodiment 5 thus offers the same advantage as the embodiment 4.

Embodiment 6

Figure 8:
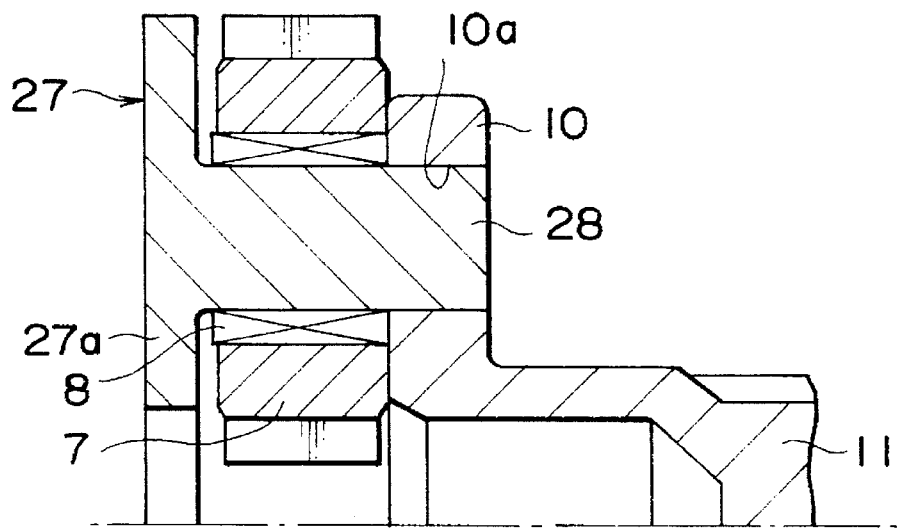
FIG. 8 is a cross-sectional view showing the major components of the planetary gear reduction mechanism according to embodiment 6 of the present invention.

In the embodiment 6 as shown in FIG. 8, disposed on the front side of the substantially circular flange portion 27a of a plate 27 are a ring of support pins 28 circumferentially equally spaced in a circle so that the support pins 28 are engaged with the plurality of through holes 10a disposed in the flange portion 10. The diameter of the support pins 28 is designed to be slightly larger than the inner diameter of the through holes 10a. With the planetary gears 7 attached onto the support pins 28, the plate 27 is secured by press-fit inserting the top portion of each support pin 28 into the corresponding through hole 10a of the flange portion 10. The rest of the construction remains unchanged from that of the embodiment 4.

In the embodiment 6, the plate 27 is attached to the flange portion 10 with the support pins 28 of the plate 27 press-fit inserted into the through holes 10a of the flange portion. The plate 27 covers the planetary gears 7. The embodiment 6 offers the same advantage as the embodiment 4. In the embodiment 6, however, the support pins 28 are integrally formed with the plate 27, and thus the component count is accordingly reduced.

Embodiment 7

Figure 9:
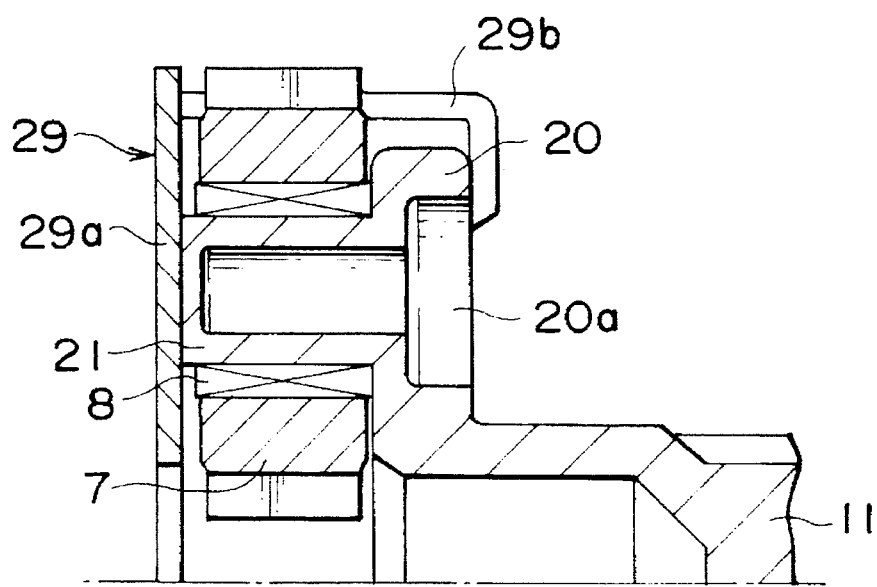
FIG. 9 is a cross-sectional view showing the major components of the planetary gear reduction mechanism according to embodiment 7 of the present invention.
Figure 10:
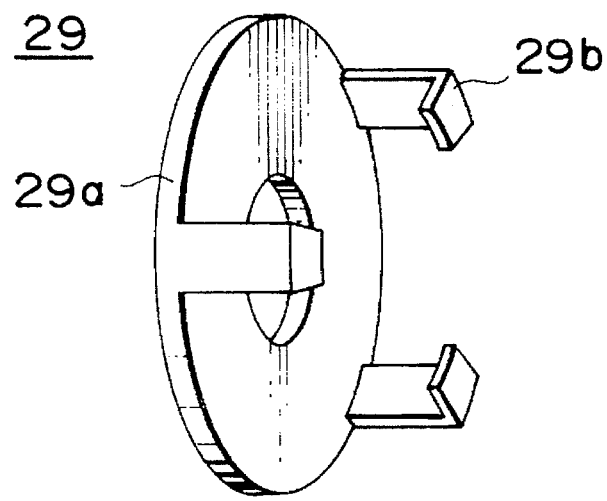
FIG. 10 is a perspective view showing a plate in the planetary gear reduction mechanism according to embodiment 7 of the present invention.

In the embodiment 7 as shown in FIGS. 9 and 10, a plate 29 has a ring of tabs 29b circumferentially equally spaced and extending radially inwardly from the edge of the substantially circular flange portion 29a. With the planetary gears 7 attached to the support pins 21, the plate 29 is mounted. The front side of the flange portion 29a abuts the end surface of the support pin 21, and each tab 29b extends between two neighboring planetary gears 7 and is put into an elastic locking engagement with the circumference of the flange portion 20. Each support pins 21 has a hollow closed at its rear side.

In the embodiment 7, the plate 29 is rigidly attached onto the flange portion 20 so that the plate 29 covers the planetary gears 7 rotatably supported by the support pins 21. The embodiment 7 thus offers the same advantage as the embodiment 1.

Embodiment 8

In the embodiment 8, the flange portion 20 has on its circumference a restraint portion for restraining circumferential movement of the tab 29 with reference to the embodiment 7.

In this case, when the flange portion 20 rotates, the restraint portion restrains the circumferential movement of the plate 29 causing both the flange portion 20 and the plate 29 to integrally rotate. The restraint portion thus prevents the plate 29 from relatively rotating and the tab 29b from touching the planetary gear 7 during rotation of the flange portion 20.

Embodiment 9

Figure 11:
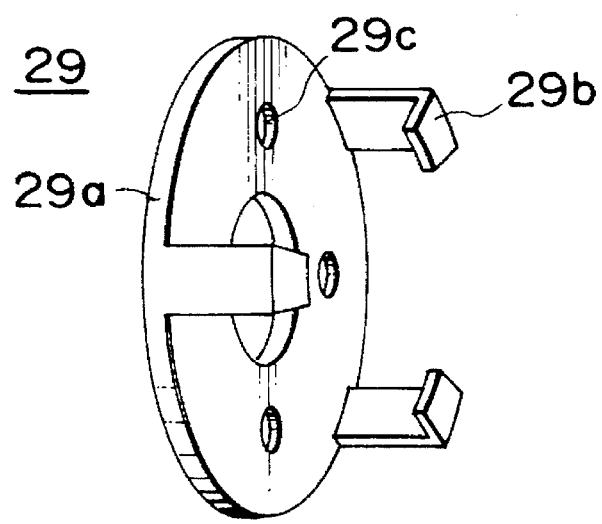
FIG. 11 is a perspective view showing a plate in the planetary gear reduction mechanism according to embodiment 9 of the present invention.

In the embodiment 9 as shown in FIG. 11, the plate 29 has on its front side of the substantially circular flange portion 29a a ring of socket portions 29c that are circumferentially equally spaced in a circle, and the socket portions 29c are engaged with the plurality of support pins 21 projected from the flange portion 20. The inner diameter of the socket portions 29c is designed to be equal to the diameter of the support pins 21. With the planetary gears 7 attached onto the support pins 21, the plate 29 is mounted by inserting the top portion of each support pin 21 into the corresponding socket portion 29c. Each tab 29b extends between two neighboring planetary gears 7 and is put into an elastic locking engagement with the circumference of the flange portion 20. The rest of the construction remains unchanged from that of the embodiment 7.

In the embodiment 9, the plate 29 is rigidly attached onto the flange portion 20 so that the plate 29 covers the planetary gears 7 rotatably supported by the support pins 21. The embodiment 9 thus offers the same advantage as the embodiment 7. Furthermore in the embodiment 9, since the socket portions 29c disposed on the front side of the flange portion 29a receive the ends of the support pins 21, circumferential movement of the plate 29 relative to the flange portion 20 is restrained. During rotation of the flange portion 20, the plate 29 is prevented from circumferentially moving, and thus contact inference of the tab 29b with the planetary gears 7 is avoided.

Although each of the above embodiments is illustrated in connection with the planetary gear reduction mechanism for use as the internal combustion engine starter, the present invention finds other applications which use a planetary gear reduction mechanism.

What is claimed is:

1. A planetary gear reduction mechanism for a starter motor of an internal combustion engine, said mechanism comprising: an inner gear (4), an output shaft (11) which has an integrally formed flange portion (10;20) on a rear side thereof and which is supported by a bearing (12) attached to the inner circumference of a flange (4a) of said inner gear, a motor rotation shaft (2) supported by a bearing (13) attached in a socket portion of the output shaft on a rear side inner circumference thereof, a ring of a plurality of support pins (21;24;28) circumferentially spaced in a circle on the rear side of said flange portion, a plurality of planetary gears (7) rotatably supported about said plurality of support pins such that said plurality of planetary gears mesh with said inner gear and a sun gear (6) formed on a front end of said motor rotation shaft, and a substantially circular plate (22;23;25;26;27;29) which has on a front side thereof a ring of a plurality of mating portions circumferentially spaced in a circle, wherein said plurality of mating portions are engaged with said plurality of support pins such that said circular plate separates and isolates said planetary gear reduction mechanism from the starter motor to attendantly avoid damage to the meshed gears by motor generated dust particles.

2. The planetary gear reduction mechanism according to claim 1, wherein each of said support pins is of an open-ended cylindrical shape, and each of said mating portions of said plate is a projection having a diameter slightly greater than the inner diameter of said support pins, whereby said plate is mounted onto said support pins by press-fit inserting said projections into said support pins.

3. The planetary gear reduction mechanism according to claim 1, wherein each of said mating portions of said plate is a socket portion having an inner diameter slightly smaller than the diameter of said support pins, whereby said plate is mounted onto said support pins by press-fit inserting said support pins into said socket portions.

4. The planetary gear reduction mechanism according to claim 3, wherein said socket portion is a through hole.

* * * * *